(12) United States Patent
Chung

(10) Patent No.: US 8,825,840 B2
(45) Date of Patent: Sep. 2, 2014

(54) SYSTEMS AND METHODS FOR SELF-ADJUSTING LOGGING OF LOG MESSAGES

(75) Inventor: Christopher Choi Chung, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 717 days.

(21) Appl. No.: 13/032,364

(22) Filed: Feb. 22, 2011

(65) Prior Publication Data

US 2012/0215907 A1     Aug. 23, 2012

(51) Int. Cl.
G06F 15/173     (2006.01)

(52) U.S. Cl.
USPC ........................................................ 709/224

(58) Field of Classification Search
CPC ................ G06F 11/3466; G06F 21/55; G06F 2201/865; H04L 41/06; H04L 41/0604; H04L 41/0609; H04L 41/0613; H04L 41/0618; H04L 41/0622; H04L 41/0627; H04L 63/1408; H04L 63/1416; H04L 63/1425; H04L 63/1441; H04L 63/1458; H04L 63/20; H04L 67/02
USPC ........................................................ 709/224
See application file for complete search history.

(56) References Cited

U.S. PATENT DOCUMENTS

| | | | |
|---|---|---|---|
| 7,293,083 B1 * | 11/2007 | Ranous et al. ................. | 709/224 |
| 7,398,429 B2 | 7/2008 | Shaffer et al. | |
| 7,506,314 B2 | 3/2009 | Kollmann et al. | |
| 2005/0223283 A1 * | 10/2005 | Frey et al. ........................ | 714/20 |
| 2006/0085667 A1 * | 4/2006 | Kubota et al. ..................... | 714/4 |
| 2006/0088027 A1 | 4/2006 | Becker | |
| 2006/0174165 A1 * | 8/2006 | Shaffer et al. .................... | 714/47 |
| 2006/0190558 A1 * | 8/2006 | Kanda et al. .................. | 709/217 |
| 2009/0198707 A1 | 8/2009 | Rohner | |
| 2011/0067008 A1 * | 3/2011 | Srivastava et al. ............ | 717/128 |
| 2011/0161973 A1 * | 6/2011 | Klots et al. .................... | 718/104 |

FOREIGN PATENT DOCUMENTS

KR     1020090054156 A     5/2009

OTHER PUBLICATIONS

PCT International Search Report for PCT/US2011/030567, Applicant: Intuit Inc., Form PCT/ISA/210 and 220, dated Mar. 23, 2012 (5 pages).
PCT Written Opinion of the International Search Authority for PCT/US2011/030567, Applicant: Intuit Inc., Form PCT/ISA/237, dated Mar. 23, 2012 (6 pages).

\* cited by examiner

Primary Examiner — Christopher Biagini
(74) Attorney, Agent, or Firm — Vista IP Law Group LLP

(57) ABSTRACT

Systems, methods and articles of manufacture for logging computer generated log messages utilizing a computerized feedback signal. A logging server logs computer generated log messages from a log source at a logging server at a first detail level. The detail level of logging is the amount of information or data logged for a given activity. A log analyzer analyzes the log messages being logged by the logging server at a first detail level. Then, in response to a computerized feedback signal based upon the analysis of the log messages by the log analyzer, the detail level of logging at the logging server is automatically modified to a second detail level which is different than the first detail level.

21 Claims, 3 Drawing Sheets

SYSTEMS AND METHODS FOR SELF-ADJUSTING LOGGING OF LOG MESSAGES

BACKGROUND

The invention relates to the log messages generated by computer applications; and more particularly, to new methods and systems for logging of computer generated log messages.

Computer and computer systems, such as servers, personal computers, web servers, mainframe computers, workstations and the like, and the software applications running on such systems typically generate log messages of the activity performed by them. For instance, the log messages may include information regarding log-in attempts, user identity, user log-in information, date and time, data accessed, data requested, applications accessed, etc. The log messages are logged (maintained and stored) in a log file which generally includes numerous log messages from the computer. A typical example of logging of computer generated log messages is web server logging. The logging of a web application will typically include log-in attempts, client log-in information (such as username and IP address), pages requested, bytes served, access and usage of confidential data, among other log data.

The log messages have various purposes, such as security, analyzing application, system and/or network operations and regulatory compliance. For instance, the log messages can be used for security purposes, such as identifying and preventing potential security attacks, unauthorized intrusions and security breaches. For example, a brute force attack attempting to log-in using trial and error usernames and/or passwords may be identified and blocked by managing the log messages from the targeted computer system. The log messages may also be utilized for website administration, managing server and hosting resources, usability analysis, performance analysis, and marketing and organizational planning.

Log management and intelligence tools may be utilized to aggregate, retain and analyze the potentially enormous volumes of logs generated by busy a computer system. The log management tools may determine the type and level of detail to log, how long to retain the logs, and other configuration settings. The log management tools may include log analyzers for analyzing the logs. The log analyzers can be configured to detect security issues, and analysis useful for the other functions of log messages described above.

Current logging methods and systems log at a specified detail level, until a user, such as a network administrator, modifies the detail level for some reason. For instance, under normal conditions, the detail level typically includes only a subset of the full set of logging information accessible for logging by system. In addition, the amount of logging may be limited by the amount of bandwidth available for logging, such as a number of licenses or computing resources available. Moreover, logging has a real cost in terms of data transmission bandwidth, storage resources, and computing resources. Therefore, maximum logging at all times may be inefficient and costly. This baseline detail level of logging is preferably enough to detect or correlate a potential security event, and to provide sufficient information for analyzing operations and marketing purposes.

If an event occurs, such as the detection of a potential security breach, or a need for more detailed operational or marketing analysis, the system is manually adjusted to modify the logging configuration to change the detail level of logging. For example, if a potential security breach is detected, an alert, warning or red flag is sent to a network administrator in the form of an email, SMS, pager message, or other notification. Then, the network administrator must modify the logging configuration to modify the logging detail. In the case of a potential security breach, the network administrator will increase the detail level of logging to include enough information to verify whether a security breach as occurred, and to investigate the potential breach. After the event has been resolved, the network administrator will typically configure the logging back to the baseline detail level.

Accordingly, there is a need for a more efficient method and system for modifying logging of computer generated log messages.

SUMMARY

The present invention is directed to methods and systems for logging computer generated log messages. As described above, log messages are messaged generated by a computer system documenting the activity on the system. The activity may be website server/client activity, software application functions, or other system or software activity.

Accordingly, one embodiment of the present invention is directed to a method for logging computer generating log messages in which the detail level of logging is automatically adjusted in response to the log messages, such as an event detected by analyzing the log messages. The method comprises logging log messages from a log source at a logging server at a first detail level. The detail level of logging is the amount of information or data logged for a given activity. The log source may be any computer, computer system, server, web server or the like. The logging server may be any one or more computers and computer servers configured to receive log messages from the log source. The first detail level is the amount of logging information that the logging source logs the log messages. For example, the first detail level may include only a subset of the amount of logging information produced by the log source. Alternatively, the first detail level can be a super set, or most, or all of the available logging information produced by the log source.

A log analyzer analyzes the log messages being logged by the logging server at a first detail level. Then, in response to a computerized feedback signal based upon the analysis of the log messages by the log analyzer, the detail level of logging at the logging server is modified to a second detail level which is different than the first detail level. As used herein, the terms "computerized" and "automatically" mean that a function is performed by one or more computers without human action or intervention. For instance, the log analyzer may detect a security event from the log messages, and may then create a computerized feedback signal to increase the detail level of logging from the first detail level to a higher second detail level in order to verify and investigate the security event. Alternatively, the log analyzer may determine that a security event was false, or has ended, and may then create a computerized feedback signal to decrease the detail level of logging from the first detail level to a lowered second detail level.

The detail level of logging at the logging server may be modified by modifying the detail level at any suitable stage of the logging process. For instance, the detail level may be modified at the logging source, such that the logging source sends a different detail level of logging to the logging server, or the logging server can modify a filtering of log messages being performed at the logging server, or a modification can be made at a log collection and forwarding server situated between the log source and the logging server, or an adjustment can be made at another suitable stage of the logging process.

In another embodiment of the present invention, a method for logging computer generating log messages from a plurality of log sources at a shared logging server automatically adjusts the detail level of logging in response to a computerized feedback signal, such as a signal based upon a change in required resources by one of the log sources. Similar to the method above, the method comprises logging log messages from a plurality of log sources at a shared logging server at a respective first detail level. In other words, a first log source is logged at a first detail level for the first log source, and a second log source is logged at a first detail level for the second log source, and so on, wherein the first detail level for each log source may or may not be the same detail level as the respective first detail level for other log sources.

Then, in response to a computerized feedback signal, the detail level of logging of log messages at the logging server for at least one of the log sources is modified to a second detail level different from its respective first detail level. For instance, the computerized feedback signal could be in response to an event similar to that described above, or it could be a signal related to a change in the level of logging resources available to the logging server or a change in the level of logging resources utilized by one of the log sources.

In another aspect of the invention, the logging of log messages from at least one of the log sources may be re-routed to a different logging server in response to the computerized feedback signal. As an example, a first log source may be generating a larger volume of log messages than usual, and the logging server may not be able to handle the additional volume. A computerized feedback signal can configure the system to re-route log messages from a second log source to a different logging server to free up logging capacity at the logging server to handle the increased volume from the first log source. Hence, the detail level of logging of log messages at the logging server is modified to zero by re-routing. As another example, suppose that a security event happens, and the detail level changes to some level that has huge storage requirements, or contains sensitive information that requires a different data management for regulatory reasons. It may be advantageous to take the log stream and duplicate it and send two exact log streams to different places. One destination would continue analysis, while the duplicate(s) stream may go to a secure data storage server.

Another embodiment of the present invention is directed to a logging system for implementing the above-described methods of logging computer generated log messages. The system may comprise a logging server including one or more computers, servers and/or website servers. The logging server is connected through a communication network to one or more log sources. The logging server may have an integrated log analyzer or the log analyzer may be provided on a separate server which is connected to the logging server through a communication network. As described above, the system may also include a log collection and forwarding server situated connected to the log source and the logging server through a communication network. For example, in one embodiment, the system is configured to perform the following steps: (a) logging log messages from a log source at a logging server at a first detail level; (b) analyzing the log messages from the log source by a log analyzer; and (c) modifying the detail level of logging of log messages to a second detail in response to a computerized feedback signal based upon the analysis of the log messages by the log analyzer.

Another embodiment is directed to an article of manufacture comprising a computer program carrier readable by a computer and embodying instructions executable by the computer to program a computer system to perform the steps of at least one of the method embodiments for logging computer generated log messages, including: (a) logging log messages from a log source at a logging server at a first detail level; (b) analyzing the log messages from the log source by a log analyzer; and (c) modifying the detail level of logging of log messages to a second detail in response to a computerized feedback signal based upon the analysis of the log messages by the log analyzer.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant.

DETAILED DESCRIPTION OF ILLUSTRATED EMBODIMENTS

Embodiments of the present invention are directed to systems, methods and apparatus for logging computer generated log messages. In general, the invention comprises a systems for logging of computer generated log messages utilizing a computerized feedback signal. The system comprises a logging server having one or more computers, servers and/or website servers. The logging server is connected through a communication network to one or more log sources. The logging server may have an integrated log analyzer or the log analyzer may be provided on a separate server which is connected to the logging server through a communication network. The system may also include a log collection and forwarding server situated connected to the log source and the logging server through a communication network. The logging server logs computer generated log messages from a log source at a logging server at a first detail level, for example log information including s subset of all of the logging data generated by the computer. The detail level of logging is the amount of information or data logged for a given activity. A log analyzer then analyzes the log messages being logged by the logging server at a first detail level. Then, in response to a computerized feedback signal based upon the analysis of the log messages by the log analyzer, the detail level of logging at the logging server is automatically modified to a second detail level which is different than the first detail level. For instance, if a security event is detected, the feedback signal may instruct to increase the level of detail from the first detail level. Thus, an automated system is provided for adjusting the level of detail logged by a logging system without requiring human intervention.

Systems, methods and articles of manufacture for logging computer generated log messages utilizing a computerized feedback signal. A logging server logs computer generated log messages from a log source at a logging server at a first detail level. The detail level of logging is the amount of information or data logged for a given activity. A log analyzer analyzes the log messages being logged by the logging server at a first detail level. Then, in response to a computerized feedback signal based upon the analysis of the log messages by the log analyzer, the detail level of logging at the logging server is automatically modified to a second detail level which is different than the first detail level.

Figure 1:
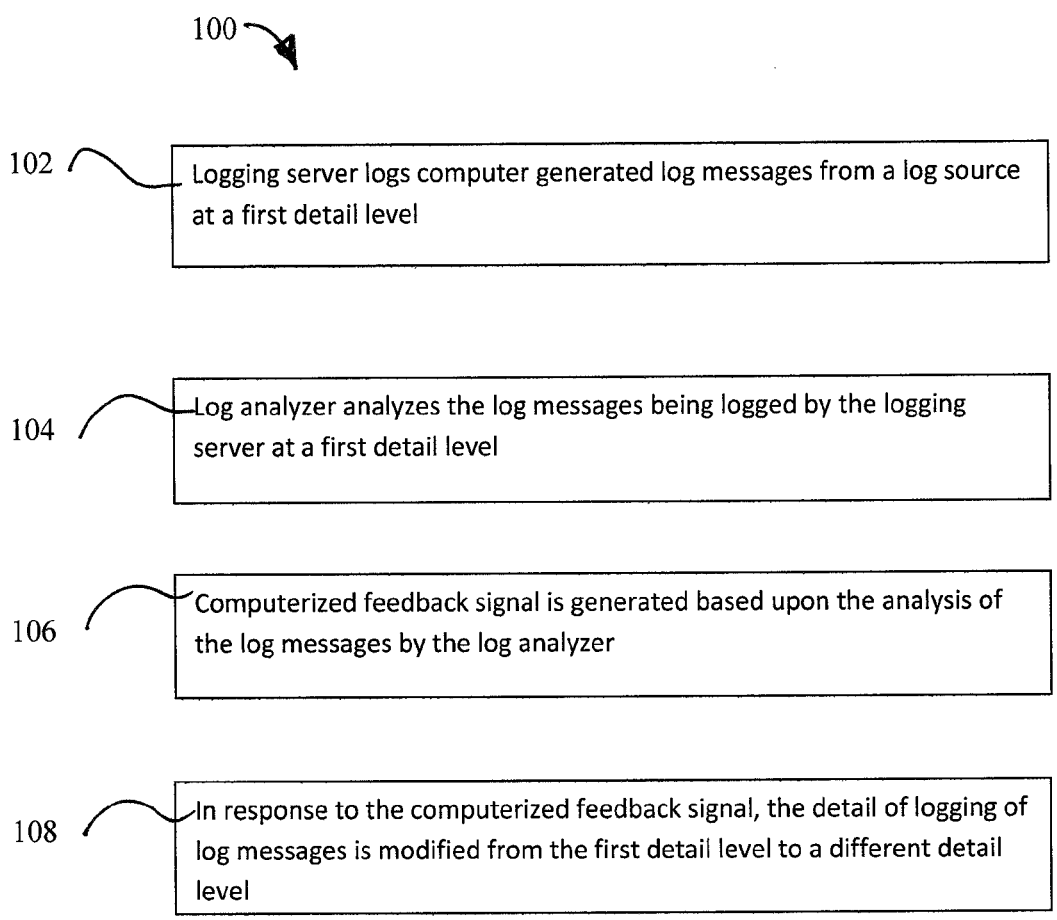
FIG. 1 is a flow chart of a method for logging computer generated log messages according to one embodiment of the present invention.

Referring to FIG. 1, in one embodiment, a method 100 for logging computer generated log messages is shown. The method 100 comprises a step 102 in which a logging server logs computer generated log messages from a log source at a first detail level. The log source can be any computer, computer system, server, web server or similar that generates log messages of its activity. The logging server is configured to access and store the log messages, and may be a log monitoring/log correlation server which may have any of various log management functionalities. The logging server may access the log messages by the log source transmitting the log messages to the logging server through a communication network. The logging server may also have a log analyzer, or the log analyzer may be hosted on separate server connected to the logging server. The logging server may be licensed by the user. As is often the case, the logging server licenses may be based on bandwidth.

The detail level of logging is the amount of information or data logged for certain activities of the log source. For example, if the log messages are related to a client log-in, one detail level may include only the username and password information for the client log-in. A different detail level for the same client log-in activity may include the log-in time and the client IP address, in addition to the username and password information. Still another detail level for a client log-in may include the username, password attempts, log-in time, IP address, pages accessed, data accessed, and even other activity information such as files added or deleted, account setting changes, or more.

The detail level of logging at the logging server can be set at various stages of the logging process, depending on the configuration of the logging system. For example, the log source can set the detail level of logging by sending a certain detail level of log messages. Alternatively, the detail level of logging can be set by a log collection and forwarding server located between the log source and the logging server. The log collection and forwarding server can filter the log messages received from the log source and send only the filtered log messages along to the logging server. As still another embodiment, the logging server itself can filter the log messages received from the log source, and only further process the filtered log messages. It is also possible to set the detail level of logging using any combination of the above.

At step 104, the log analyzer analyzes the log messages being logged by the logging server at the first detail level. As described above, the log analyzer may be integrated with the logging server, or it may be on a separate server connected to the logging server. The log analyzer is programmed to analyze the log messages for various purposes, such as identifying security events, monitoring the performance and status of application, system and/or network operations, examining network traffic patterns, monitoring resources and reporting for regulatory compliance. For instance, the log analyzer can analyze the log messages to identify a brute force log-in attempt by detecting an abnormally high number of failed log-in attempts, especially if the attempts emanate from a small number of IP addresses or IP addresses from a small geographical area. Accordingly, the log analyzer may include what is commonly referred to as a log correlation engine, which correlates certain log message data to a pattern that indicates an event such as a potential security event. As another example, the log analyzer may detect errors in the operation of an application or the system. The log messages may contain error messages that a certain application has an error or is failing for some reason, such as an application crash, or that the system has a software, firmware or hardware failure.

At step 106, a computerized feedback signal is generated based upon the analysis of the log messages by the log analyzer to modify the detail of logging of log messages at the logging server from the first detail level to a different detail level. The log analyzer may produce the computerized feedback signal, or the log analyzer may provide information to another component that generates the computerized feedback signal. The computerized feedback signal may direct the system to increase the detail level, i.e. log more information, or decrease the detail level, i.e. log less information.

At step 108, in response to the computerized feedback signal, the detail of logging of log messages at the logging server is automatically modified from the first detail level to a different detail level. The feedback signal is computerized meaning that the feedback signal causes the modification of the detail level of logging without human action or interaction. The feedback signal can modify the detail level of logging in any suitable manner, including by modifying the setting of the detail level as described above. In one exemplary embodiment, the feedback signal can cause the detail level to be modified at the logging source. In other words, the feedback signal can instruct the logging source to transmit a different detail level of log messages to the logging server. In another embodiment, the feedback signal can modify a filtering of log messages being performed at the logging server. In still another embodiment, the feedback signal can cause the detail level of logging set by a log collection and forwarding server to be modified.

In addition, the computerized feedback signal can set the detail level in various ways, such as actively instructing the system components to log at a certain detail level, i.e. a post back or pushing method, or having the system components periodically poll a central configuration server for the desired detail level, i.e. a polling method. In the post back method, those system components that set the detail level of logging (such as the log source, the logging server and/or the log collection and forwarding server) are instructed to modify the detail level of logging in response to the computerized feedback signal. In the polling method, the computerized feedback signal modifies a setting in a central configuration server (which may be the logging server or other server within the system). Then, the system components that set the detail level of logging log periodically poll the central configuration server, and modify the detail level of logging upon detecting a change in the setting in the central configuration server. The polling method may be less desirable because there is a possible lag time between the polling during which logging detail may be lost, but it may be an option for configurations in which post back may not be usable. For example, if the logging source is javascript running in a browser page, there is not a way for the server to post back a message to the browser page. The javascript in the page would need to be configured to poll the server periodically, as it provides logging detail.

As an example, if at step 104, the log analyzer detects a potential security breach, a computerized feedback signal is generated at step 106 to increase the detail level of logging in order to verify whether the breach is a real threat or a false positive from a correlated event. At step 108, in response to the computerized feedback signal, the detail of logging messages is increased from the first detail level to an increased detail level. The additional information may be required to make this determination. The increased logging detail may also provide important information for investigating the security event, forensics analysis, troubleshooting, corrective action, liability management, marketing analysis, usability analysis, etc. Once the log analyzer determines that the security threat has passed, or the need for increased detail level of logging has ended, another computerized feedback signal may be generated to again modify the detail level of logging, such as reducing the detail level from the increased detail level back to the first detail level.

Figure 2:
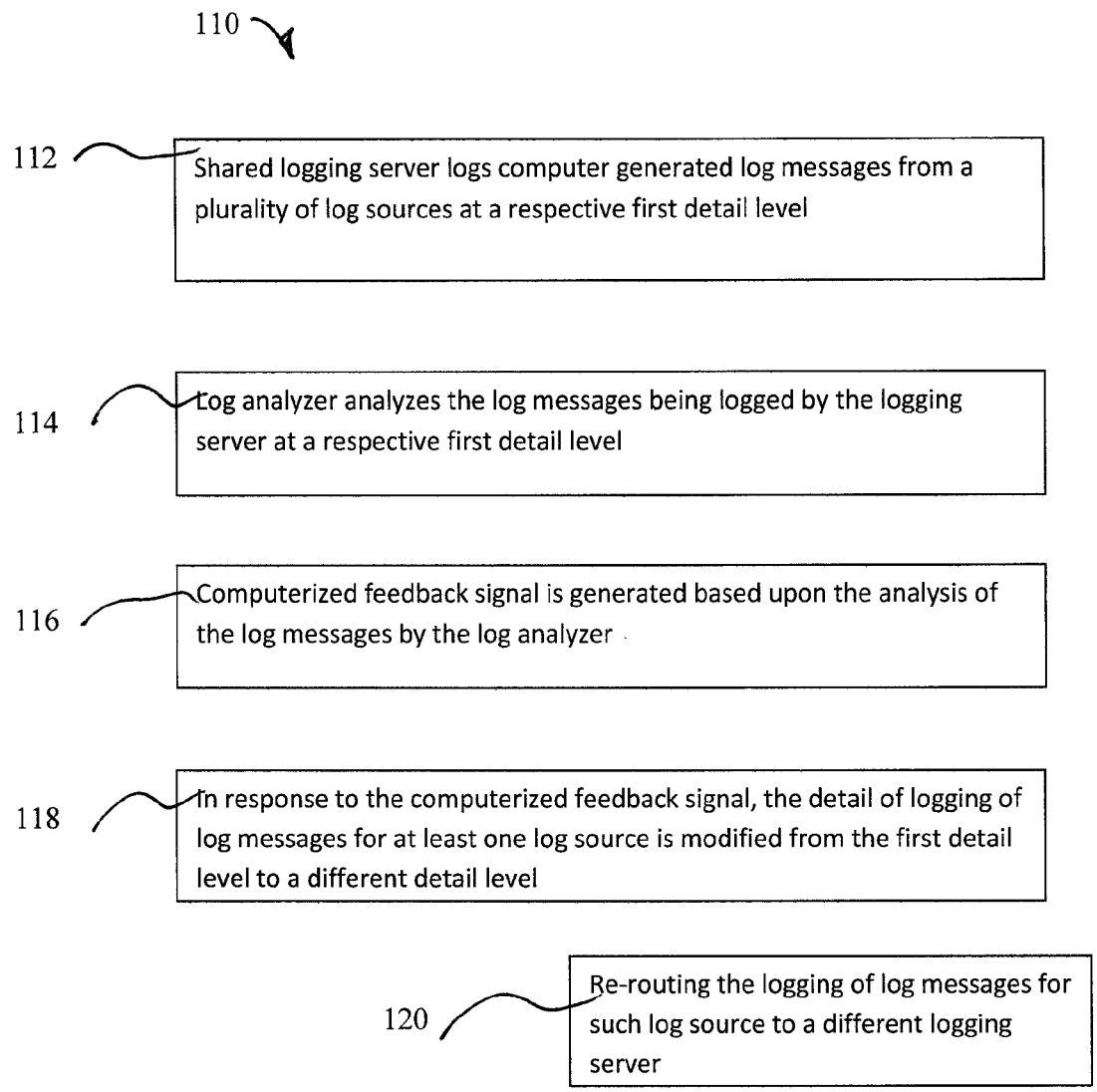
FIG. 2 is a flow chart of a method for logging computer generated log messages according to another embodiment of the present invention.

Turning now to FIG. 2, another embodiment of a method 120 for logging computer generated messages is shown. The method 120 utilizes some of the same processes and components as method 100 described above. Accordingly, the description above for such processes and component applies equally for method 120. The method 120 comprises a step 122 in which a shared logging server logs computer generated log messages from a plurality of log sources. The log messages are logged by the logging server at a respective first detail level for each log source. This means that the detail level for each log source is at a first detail level for the particular log source, and does not require that the first detail level for each log source is the same detail level. That is, the first log source is logged at a first detail level for the first log source, and the second log source is logged at a first detail level for the second log source, and so on, wherein the first detail level for each log source may or may not be the same detail level as the respective first detail level for other log sources.

The detail level of logging for each of the log sources for method 110 can be set in the same or similar manner as described above for method 100.

At step 114, a log analyzer analyzes the log messages from each of the log sources being logged by the logging server at a respective first detail level. The log analyzer and step of analysis is the same or similar to step 104 of method 100 described above, except that the log analyzer analyzes log messages from a plurality of log sources.

At step 116, a computer feedback signal is generated based upon the analysis of the log messages by the log analyzer. The computer feedback signal indicates to modify the detail level of logging of log messages at the logging server for at least one of the log sources from the respective first detail level to a second detail level different from its respective first detail level.

At step 118, in response to the computerized feedback signal, the detail of logging of log messages for at least one of the log sources is automatically modified from its respective first detail level to a different detail level. The feedback signal can cause the detail level to be modified in the same of similar manner as described above step 108 for method 100.

In another aspect of the method 110, at step 120 the step of modifying the detail level of logging for at least one of the log source is modified by re-routing the logging of log messages from such log source to a different logging server in response to the computerized feedback signal. As one example, a shared logging server is logging log messages from a first log source and a second log source, at a respective first detail level for each log source. Assume that the log analyzer detects that the first log source is generating a larger volume of log messages than usual, and the logging server may not be able to handle the additional volume. A computerized feedback signal is generated to re-route the log messages from the second log source to a different logging server to free up logging capacity at the logging server to handle the increased volume from the first log source. As a result, the detail level of logging of log messages at the logging server for the second log source is modified to zero by re-routing. In addition, the detail level of logging of the first log source may be increased in order to analyze in more detail the reasons for the increased volume of log messages. For instance, the increased volume may correlate to a potential security event, such as a brute force log-in attack.

Figure 3:
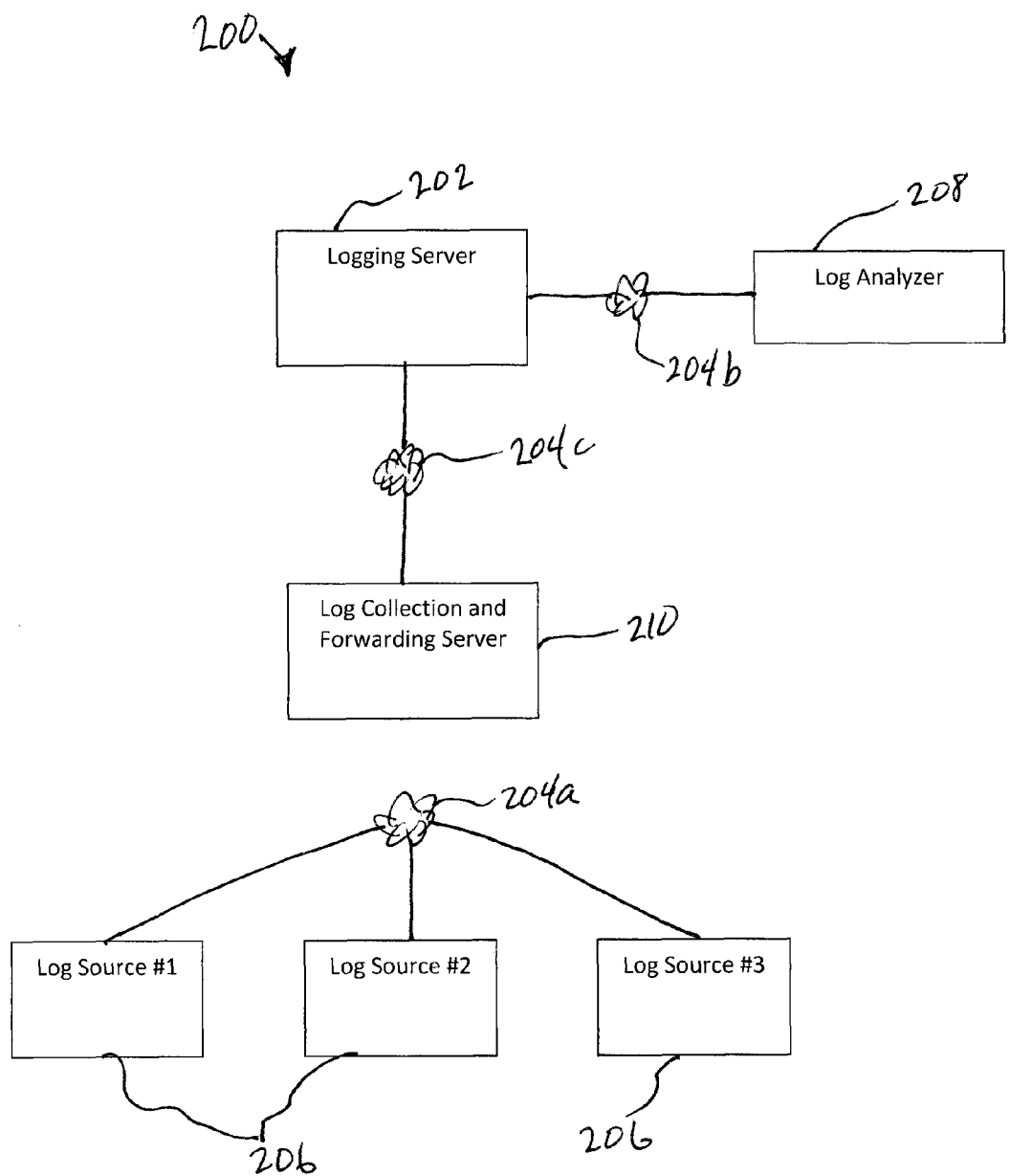
FIG. 3 illustrates an exemplary system for logging computer generated log messages according to another embodiment of the present invention.

Referring now to FIG. 3, a non-limiting example of a system 200 is depicted that may be used to implement any of the methods for logging computer generated log messages, including methods 100 and 120 described above and any other method embodiments described herein. It should be understood that not all of the components of the system 200 may be needed to implement the methods of the present invention, and therefore, the system may include only those components necessary to perform the method embodiments as described herein.

The system 200 comprises a logging server 202 which including one or more computers, servers and/or website servers. The logging server 202 may be connected through a communication network to one or more log source(s) 206, or as shown in the embodiment of FIG. 3, a log collection and forwarding server 210 may be implemented between the logging server 202 and the log sources 206. The log sources 206 may be any computer, computer system, server, web server or similar system that generates log messages of activity.

The system 200 includes a log analyzer 208, which is a system that is configured to analyze log messages, as described above. In the embodiment of FIG. 3, the log analyzer 208 is provided on a separate server from the logging server 202. The log analyzer 208 is connected to the logging server 202 through a communication network 204b. Alternatively, the log analyzer 208 may be integrated with the logging server 202, and/or provided on the same server as the logging server 202.

In another aspect, the system 200 may also include a log collection and forwarding server 210 operably coupled between the log source(s) 206 and the logging server 202. The log source(s) 206 and logging server are connected to the log collection and forwarding server 210 through communication networks 204a and 204c, respectively. Examples of the functionality of the log collection and forwarding server 210 are described above. In one embodiment, the system 200 is configured such that the log collection and forwarding server 210 is a logging component for the application through which all of the log messages from the log sources go through. The log collection and forwarding server 210 has a filter for directing the filtered log messages to the data to the central logging server. The log collection and forwarding server 210 contains filtering rules that may be checked at run time for each log message received from the log source(s) 206. The filtering rules can be updated on the fly, and since the rules may be checked for each and every log entry, the detail level of logging can be modified in response to a computerized feedback signal based upon the analysis of the log messages by the log analyzer 208. The log collection and forwarding server 210 may have a listening socket or respond to an HTTP request as the computerized feedback signal to modify filtering rules in order to modify the detail level of logging at the logging server 202.

The logging server 202 may support rule logic sets (currently, this is standard for logging servers), but the logging server 202 may also be provided with a plug-in (many logging servers support plug-ins), also called a "module" or set of script(s) that are executed, that would enable rules for logging detail level to post back to the log sources 204, and/or the log collection and forwarding server 210, in response to a computerized feedback signal based upon an analysis by the log analyzer 208. The plug-in may maintain a look up directory of all the log source(s) 206 associated with a particular application or system, and post back to all of them in response to a computerized feedback signal.

The communication networks 204a-c may include a proprietary network, LAN, WAN, cellular network, wireless network, the internet and/or other suitable network, or any combination thereof.

Accordingly, a system 200 is provided which can provide and implement the methods for logging computer generated log messages according to the methods 100 and 140, and any other methods described herein.

The methods 100 and 120, as well as any other method embodiments described herein, may also be embodied in, or readable from, a computer-readable medium (computer program carrier), e.g., one or more of the fixed and/or removable data storage data devices and/or data communications devices connected to a computer. The computer program carrier is readable by a computer and embodies instructions executable by the computer to perform the method steps of programming a computer to perform the method 100, or any other method embodiments described herein. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, and DVD-RW. Data communication devices may include any suitable electronic communication device, including without limitation, communication networks, hard drives, or other storage devices.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

What is claimed is:

1. A method for logging computer generated log messages, comprising:
    logging log messages regarding a computer system from a log source at a logging server at a first detail level
    analyzing the log messages and identifying a potential security threat to the computer system;
    creating a computerized feedback signal based at least in part upon identifying a potential security threat to the computer system;
    modifying the detail level of logging of log messages at said logging server to a second detail level different than said first detail level in response to the computerized feedback signal.

2. The method of claim 1, wherein the step of analyzing said log messages is performed by a log analyzer.

3. The method of claim 1, wherein said feedback signal instructs said log source to modify the detail level of logging such that the detail level of log messages sent from said log source to said logging server is modified.

4. The method of claim 1, wherein said feedback signal instructs said logging server to modify the detail level of logging such that the detail level of log messages logged at the logging server is modified.

5. The method of claim 1, wherein said feedback signal is based, at least in part, upon a computerized analysis of said log messages by a logging server having a log analyzer application; wherein the logging server having a log analyzer application may be the same logging server logging messages at a first detail level or a different second logging server.

6. The method of claim 1, wherein said feedback signal is based, at least in part, upon a computerized analysis of logging resources and a logging threshold for said logging server.

7. The method of claim 1, wherein said feedback is based, at least in part, upon a computerized analysis of said log messages by a logging server having a log analyzer application and a computerized analysis of logging resources and logging threshold for said logging server; wherein the logging server having a log analyzer application may be the same logging server logging messages at a first detail level or a different second logging server.

8. The method of claim 1, further comprising
    analyzing the log messages at the second detail level to determine whether the potential security threat is valid or a false positive.

9. The method of claim 8, further comprising:
    analyzing the log messages at the second detail level to determine that the security threat is no longer present;
    creating a second computerized feedback signal based at least in part upon determining that the security threat is no longer present; and
    modifying the detail level of logging of log messages from the second detail level to the first detail level in response to the second computerized feedback signal.

10. A method for logging computer generated log messages, comprising:
    receiving, at a log collection and forwarding server, log messages from a log source at a first detail level;
    filtering said log messages at said log collection and forwarding server at a first filtering level to produce log messages at a second detail level;
    analyzing the log messages and identifying a potential security threat to a computer system;
    creating a computerized feedback signal based at least in part upon identifying a potential security threat to the computer system;
    modifying the filtering of log messages by said log collection and forwarding server from said first filtering level to a second filtering level different from said first filtering level to produce log messages at a third detail level, in response to the computerized feedback signal from a computerized feedback mechanism.

11. The method of claim 10, further comprising the step of:
    sending said log messages from said log collection and forwarding server to a logging server at the filtering level of said log collection and forwarding server.

12. The method of claim 11, wherein said log collection and forwarding server and said logging server are comprised of a single overall server.

13. The method of claim 10, wherein said log collection and forwarding server and said logging server are separate servers.

14. A method for logging computer generated log messages, comprising:

logging tog messages from a plurality of log sources at a shared logging server, each log source being logged at a respective first detail level;

analyzing the log messages and identifying a potential security threat to a computer system;

creating a computerized feedback signal based at least in part upon identifying a potential security threat to the computer system;

modifying the detail level of logging of log messages at said shared logging server for at least one of said log sources to a second detail level different than its respective first detail level in response to the computerized feedback signal.

15. The method of claim 14, further comprising the step of:
re-routing the logging of log messages from at least one of said log sources to a different logging server in response to said computerized feedback signal.

16. The method of claim 15, wherein said feedback signal is based, at least in part, upon a change in the level of logging resources of said logging server being utilized by at least one of said plurality of tog sources.

17. The method of claim 14, wherein said feedback signal is based, at least in part, upon a priority list of said plurality of log sources, wherein said priority list prioritizes said plurality of log sources in order of priority for utilizing said log resources.

18. A system for logging computer generated log messages, comprising:
a logging server comprising at least one hardware processor, the logging server in communication with a log source which generates computer generated log messages, said logging server configured to perform the Wowing steps:
logging log messages from a log source at a logging server at a first detail level;
analyzing the log messages and identifying a potential security threat to a computer system;
creating a computerized feedback signal based at least in part upon identifying a potential security threat to the computer system;
modifying the detail level of logging of log messages to a second detail level different than said first detail level in response to the computerized feedback signal from a computerized feedback mechanism.

19. The system of claim 18, further comprising:
a log collection and forwarding server situated between said logging server and said log source, and in operable communication with said logging server and said log source, wherein said log collection and forwarding server is configured to receive log messages from said log source, filter the log messages and forward the filtered log messages to said logging server.

20. The system of claim 18, further comprising a log analyzer configured to perform the analyzing said log messages from said log source.

21. An article of manufacture comprising a non-transitory computer readable medium and embodying instructions executable by the computer to program a computer to perform the following steps for logging computer generated log messages:
logging log messages from a log source at a logging server at a first detail level;
analyzing the log messages and identifying a potential security threat to a computer system;
creating a computerized feedback signal based at least in part upon identifying a potential security threat to the computer system;
modifying the detail level of logging of log messages to a second detail level different than said first detail level in response to the computerized feedback signal from a computerized feedback mechanism.

* * * * *